United States Patent
Vogel

(10) Patent No.: US 9,492,880 B2
(45) Date of Patent: Nov. 15, 2016

(54) WELDING POWER SUPPLY WITH DIGITAL CONTROLLER

(71) Applicant: ILLINOIS TOOL WORKS INC., Glenview, IL (US)

(72) Inventor: Bernard J. Vogel, Troy, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/849,260

(22) Filed: Sep. 9, 2015

(65) Prior Publication Data
US 2015/0375328 A1  Dec. 31, 2015

Related U.S. Application Data

(60) Division of application No. 14/532,865, filed on Nov. 4, 2014, now Pat. No. 9,144,856, which is a continuation of application No. 14/182,113, filed on Feb. 17, 2014, now Pat. No. 8,884,188, which is a continuation of application No. 13/899,188, filed on May 21, 2013, now Pat. No. 8,653,413, which is a continuation of application No. 12/790,423, filed on May 28, 2010, now Pat. No. 8,455,794.

(60) Provisional application No. 61/183,731, filed on Jun. 3, 2009.

(51) Int. Cl.
| B23K 9/10 | (2006.01) |
| H02M 3/157 | (2006.01) |
| H02M 3/335 | (2006.01) |
| B23K 9/095 | (2006.01) |
| B23K 9/09 | (2006.01) |
| H02M 1/00 | (2006.01) |

(52) U.S. Cl.
CPC .............. *B23K 9/1043* (2013.01); *B23K 9/093* (2013.01); *B23K 9/0953* (2013.01); *B23K 9/1006* (2013.01); *B23K 9/1062* (2013.01); *H02M 3/157* (2013.01); *H02M 3/33515* (2013.01); *H02M 2001/0025* (2013.01)

(58) Field of Classification Search
CPC . B23K 9/1062; B23K 9/1043; B23K 9/0953
USPC ......... 219/130.21, 110, 115, 130.33, 130.35, 219/130.5
See application file for complete search history.

(56) References Cited

U.S. PATENT DOCUMENTS

| 3,689,734 A | 9/1972 | Burley |
| 3,689,737 A | 9/1972 | Eckles |

(Continued)

FOREIGN PATENT DOCUMENTS

| EP | 0970775 | 1/2000 |
| EP | 1138429 | 10/2001 |

(Continued)

OTHER PUBLICATIONS

International Search Report for application No. PCT/US2010/036843 mailed Nov. 18, 2010.

*Primary Examiner* — Viet Q Nguyen
(74) *Attorney, Agent, or Firm* — Fletcher Yoder P.C.

(57) ABSTRACT

A welding power supply including power conversion circuitry adapted to receive a primary source of power, to utilize one or more power semiconductor switches to chop the primary source of power, and to convert the chopped power to a welding output is provided. The provided welding power supply includes a pulse width modulated (PWM) digital controller including gate drive circuitry that generates a PWM output signal that controls the switching of the one or more power semiconductor switches. The PWM output signal includes a duty cycle term corrected for one or more sources of error in the welding system.

8 Claims, 8 Drawing Sheets

(56) References Cited

U.S. PATENT DOCUMENTS

| | | | |
|---|---|---|---|
| 4,359,622 A | 11/1982 | Dostoomian | |
| 4,384,188 A | 5/1983 | Wright | |
| 4,438,317 A | 3/1984 | Ueguri | |
| 4,521,671 A | 6/1985 | Fronius | |
| 4,544,826 A | 10/1985 | Nakanishi | |
| 4,749,935 A | 6/1988 | Osborne | |
| 4,794,232 A | 12/1988 | Kimbrough | |
| 4,866,247 A | 9/1989 | Parks | |
| 4,947,021 A | 8/1990 | Stava | |
| 5,059,766 A | 10/1991 | Gilliland | |
| 5,196,668 A * | 3/1993 | Kobayashi | B23K 11/24 219/110 |
| 5,278,390 A | 1/1994 | Blankenship | |
| 5,357,078 A | 10/1994 | Smith | |
| 5,591,355 A | 1/1997 | Ishikawa | |
| 5,600,550 A | 2/1997 | Cookll | |
| 5,864,116 A | 1/1999 | Baker | |
| 5,991,169 A | 11/1999 | Kooken | |
| 6,015,964 A | 1/2000 | Baker | |
| 6,111,216 A | 8/2000 | Stava | |
| 6,115,273 A * | 9/2000 | Geissler | B23K 9/1056 363/89 |
| 6,160,241 A | 12/2000 | Stava | |
| 6,172,888 B1 | 1/2001 | Jochi | |
| 6,225,598 B1 | 5/2001 | Nihei | |
| 6,321,139 B1 | 11/2001 | Terada | |
| 6,321,167 B1 * | 11/2001 | Jochi | B23K 11/252 219/110 |
| 6,359,258 B1 | 3/2002 | Blankenship | |
| 6,365,874 B1 | 4/2002 | Stava | |
| 6,596,970 B2 | 7/2003 | Blankenship | |
| 6,649,869 B2 | 11/2003 | Reynolds | |
| 6,710,297 B1 | 3/2004 | Artelsmair | |
| 6,717,108 B2 | 4/2004 | Hsu | |
| 6,735,537 B2 | 5/2004 | Liu | |
| 6,930,279 B2 | 8/2005 | Myers | |
| 7,049,545 B2 | 5/2006 | Matus | |
| 7,064,290 B2 | 6/2006 | Blankenship | |
| 7,105,772 B2 | 9/2006 | Houston | |
| 7,141,759 B2 * | 11/2006 | Mela | B23K 9/1056 219/130.21 |
| 7,173,214 B2 | 2/2007 | Nadzam | |
| 7,173,393 B2 | 2/2007 | Maeda | |
| 7,183,517 B2 * | 2/2007 | Albrecht | B23K 9/1056 219/130.4 |
| 7,301,308 B2 | 11/2007 | Aker | |
| 7,952,310 B2 | 5/2011 | Hamasaki | |
| 8,049,140 B2 | 11/2011 | Kawamoto | |
| 8,199,536 B2 | 6/2012 | Mangraviti | |
| 8,225,598 B2 | 7/2012 | Haeberer | |
| 8,269,141 B2 | 9/2012 | Daniel | |
| 8,278,882 B2 | 10/2012 | Gotou | |
| 8,410,398 B2 | 4/2013 | Daniel | |
| 8,455,794 B2 | 6/2013 | Vogel | |
| 8,525,077 B2 | 9/2013 | Peters | |
| 8,546,726 B2 * | 10/2013 | Vogel | B23K 9/0953 219/130.01 |
| 8,546,729 B2 | 10/2013 | Derda | |
| 8,581,147 B2 | 11/2013 | Kooken | |
| 8,637,786 B2 * | 1/2014 | Salsich | B23K 10/006 219/121.39 |
| 8,653,413 B2 | 2/2014 | Vogel | |
| 8,785,816 B2 * | 7/2014 | Kooken | B23K 9/095 219/130.1 |
| 9,018,802 B2 * | 4/2015 | Sun | C25D 11/00 307/106 |
| 2006/0054610 A1 | 3/2006 | Morimoto | |
| 2006/0175313 A1 * | 8/2006 | Kooken | B23K 9/09 219/130.1 |
| 2006/0226130 A1 | 10/2006 | Kooken | |
| 2006/0243716 A1 | 11/2006 | Stava | |
| 2007/0030612 A1 * | 2/2007 | Kamath | B23K 10/00 361/82 |
| 2007/0181547 A1 | 8/2007 | Vogel | |
| 2007/0187376 A1 * | 8/2007 | Albrecht | B23K 9/1081 219/130.1 |
| 2007/0215585 A1 * | 9/2007 | O'Connor | B23K 9/1081 219/130.1 |
| 2008/0078812 A1 | 4/2008 | Peters | |
| 2008/0296276 A1 * | 12/2008 | Schartner | B23K 9/1031 219/130.31 |
| 2010/0170880 A1 * | 7/2010 | Hsu | B23K 9/0953 219/130.1 |
| 2011/0108536 A1 | 5/2011 | Inada | |
| 2011/0220630 A1 * | 9/2011 | Speilman | B23K 9/1336 219/137 R |
| 2012/0000895 A1 | 1/2012 | Sato | |
| 2014/0374397 A1 | 12/2014 | Vogel | |

FOREIGN PATENT DOCUMENTS

| | | |
|---|---|---|
| FR | 2850463 | 7/2004 |
| GB | 2393338 | 3/2004 |
| JP | S61273260 | 12/1986 |
| JP | 2001276971 | 10/2001 |
| WO | 2008140398 | 1/2008 |

\* cited by examiner

WELDING POWER SUPPLY WITH DIGITAL CONTROLLER

CROSS REFERENCE TO RELATED APPLICATIONS

This application is a Divisional application of U.S. patent application Ser. No. 14/532,865, entitled "Welding Power Supply with Digital Controller," filed Nov. 4, 2014, which is a Continuation application of U.S. patent application Ser. No. 14/182,113, entitled "Welding Power Supply with Digital Controller," filed Feb. 17, 2014, and issued as U.S. Pat. No. 8,884,188 on Nov. 11, 2014, which is a Continuation application of U.S. patent application Ser. No. 13/899,188, entitled "Welding Power Supply with Digital Control of Duty Cycle," filed May 21, 2013, and issued as U.S. Pat. No. 8,653,413 on Feb. 18, 2014, which is a Continuation application of U.S. patent application Ser. No. 12/790,423, entitled "Welding Power Supply with Digital Control of Duty Cycle," filed May 28, 2010, and issued as U.S. Pat. No. 8,455,794 on Jun. 4, 2013, which is a Non-Provisional Patent application of U.S. Provisional Patent Application No. 61/183,731, entitled "Welding Power Supply with Digital Control", filed Jun. 3, 2009, all of which are herein incorporated by reference in their entireties for all purposes.

BACKGROUND

The invention relates generally to welding power supplies, and, more particularly, to a digital controller for a switched mode welding power supply.

Many types of welding power supplies capable of providing a welding power output from an alternating current (AC) or a direct current (DC) source of power have been developed. One such welding power supply is a switched-mode power supply, which utilizes power semiconductor switches to chop DC power from a source and convert the chopped power to a voltage and/or current suitable for welding. Switched-mode power supplies such as inverter type power supplies and chopper type power supplies have been developed to meet the needs of various welding processes and applications.

The chopper and inverter type power welding power supplies are typically controlled by similar control methods and/or circuits. One method of controlling such power supplies is with a pulse width modulation (PWM) control. A PWM control provides for regulation and control of the output current and/or voltage of the welding power supply by varying the duty cycle (i.e., the ON/OFF ratio) of power semiconductor switches located in the power supply circuitry. Traditional inverter or chopper welding power supplies include a closed loop current control loop, such that the power supply may be operated as a controlled current source for certain arc welding load conditions. As such, traditional inverter or chopper welding power supplies include an analog controller, which controls the minimum and maximum current levels output from the power source, the rates of change of current between various levels, the generation of desired current waveforms, and so forth. Unfortunately, analog controllers are often associated with drawbacks, such as the inability to adequately handle the dynamic requirements of a switched-mode welding power supply. For example, analog controllers often fall short of responding quickly enough to quickly occurring events in a welding arc, may happen with time intervals of less than 1 msec. Accordingly, there exists a need for improved control systems and methods for switched-mode welding power supplies.

BRIEF DESCRIPTION

In an embodiment, a welding power supply includes power conversion circuitry including one or more power semiconductor switches. The power conversion circuitry is adapted to receive power from a primary source and to switch the one or more power semiconductor switches between an ON configuration and an OFF configuration to convert the received power to a welding output. The welding power supply also includes a pulse width modulated (PWM) digital controller coupled to the power conversion circuitry and configured to calculate a duty cycle term for control of switching of the one or more semiconductor switches by computing an output voltage term.

In another embodiment, a welding power supply includes power conversion circuitry including one or more power semiconductor switches adapted to receive power from a primary source and to switch the one or more power semiconductor switches between an ON configuration and an OFF configuration to convert the received power to a welding output. The welding power supply also includes a pulse width modulated (PWM) digital controller including gate drive circuitry adapted to generate a PWM output signal that controls the switching of the one or more power semiconductor switches. The PWM output signal includes a duty cycle term that accounts for one or more variations in a bus voltage.

In another embodiment, a digital pulse width modulated (PWM) controller for a switched mode welding power supply is adapted to determine an output voltage term of the switched mode welding power supply, calculate a variable bus voltage term of the switched mode welding power supply, calculate a proportional error term that corrects for a difference between a commanded current level and an actual output current level of the welding power supply, and compute a duty cycle term by combining the determined output voltage term, the calculated variable bus voltage term, and the proportional error term.

In another embodiment, a welding power supply includes power conversion circuitry including one or more power semiconductor switches adapted to receive power from a primary source and to switch the one or more power semiconductor switches between an ON configuration and an OFF configuration to convert the received power to a welding output. The welding power supply also includes a pulse width modulated (PWM) digital controller adapted to sample a current and/or voltage waveform at a trigger location approximately equal to an average of the current and/or voltage waveform and to calculate a PWM output signal that controls the switching of the one or more power semiconductor switches based on the sampled current and/or voltage values.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
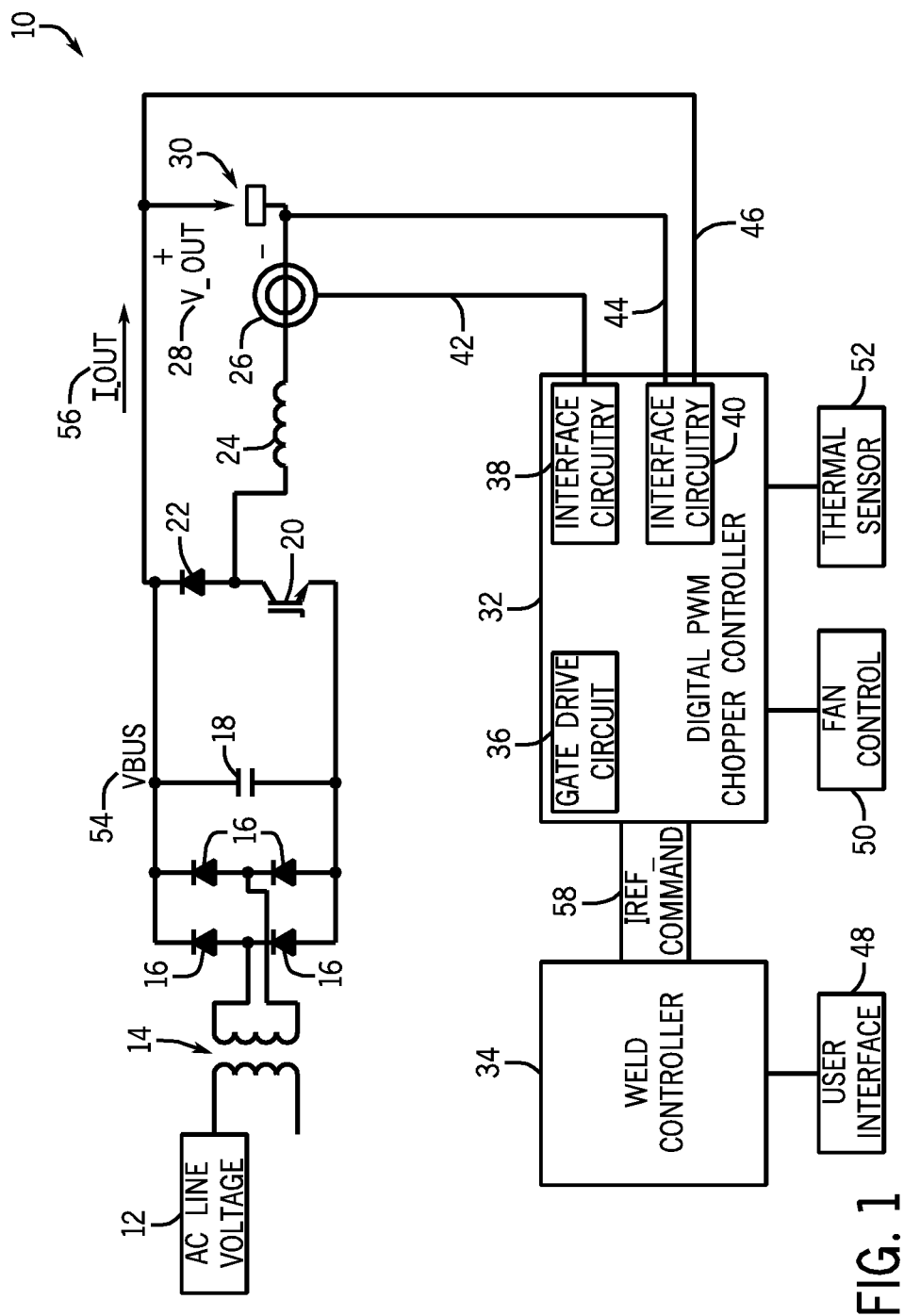
FIG. 1 is a diagram of an exemplary chopper circuit configured to function as a switched-mode welding power supply in accordance with aspects of the present invention.

FIG. 1 illustrates an exemplary chopper circuit 10 configured to function as a switched-mode welding power supply 10. The chopper circuit 10 includes an AC line voltage input 12, a transformer 14, a set of diodes 16, a capacitor 18, a power semiconductor switch 20, a diode 22, an inductor 24, a current sensor 26, an output voltage 28, and a welding arc 30. The chopper circuit 10 is controlled by a digital pulse width modulated (PWM) chopper controller 32 coupled to a weld controller 34. The digital controller 32 includes gate drive circuitry 36 configured to switch the power semiconductor switch 20 ON and OFF and interface circuitry 38, 40 configured to receive current and voltage feedback from feedback connections 42, 44, and 46. The weld controller 34 and/or the digital controller 32 may be coupled to a variety of inputs and outputs, such as the illustrated user interface 48, fan control 50, and thermal sensor 52.

During operation, the AC line voltage 12 is received by the chopper circuit 10 and is transformed by the transformer 14 to a voltage level suitable for a welding output. In the illustrated embodiment, the transformer 14 is a single phase transformer configured to operate at line frequency. In other embodiments, however, the transformer 14 may be a three phase transformer connected to an input source of three phase line voltage. Indeed, the chopper circuit 10 may be configured to receive a single nominal input AC line voltage or multiple nominal AC line voltages. As such, in certain embodiments, multiple AC line voltages may be accommodated by providing taps on the transformer 14, which may be manually or automatically linked for a particular nominal AC line voltage.

An output of a secondary coil of the transformer 14 is rectified by diodes 16, thus producing a DC bus voltage 54. The capacitor 18 is configured to smooth and filter the DC bus voltage 54. As such, in some embodiments, the capacitor 18 may be an electrolytic capacitor, a film capacitor, or any other suitable capacitor. The power semiconductor switch 20 and the diode 22 are configured to function as a power semiconductor chopper circuit, chopping the DC bus voltage 54. For example, the power semiconductor switch 20 is switched ON and OFF by the gate drive circuit 36 located in the digital controller 32 in the illustrated embodiment. As such, the switching frequency and duty cycle (i.e., the ON/OFF ratio) of the power semiconductor switch 20 are controlled by the digital controller 32 to provide a regulated output voltage and/or current of the welding power supply as dictated by a desired welding process and/or condition. In some embodiments, the switching frequency may be between approximately 10 KHz and approximately 100 KHz. For example, in some embodiments, the switching frequency may be approximately 20 KHz.

The processed DC bus voltage chopped by the power semiconductor chopper circuit is applied to the inductor 24, which smoothes and outputs the output voltage 28. That is, an output current 56 and the output voltage 28 are generated and supplied to the welding arc, welding leads, work clamps, and so forth for use in the welding operation. The current sensor 26 may be utilized to measure the output current 56 and to communicate the acquired measurements to the digital controller 32 via the connection 42. Similarly, the output voltage may be measured and communicated to the interface circuitry 40 located in the digital controller 32.

During operation, the digital controller 32 may be configured to control other functions, such as monitoring thermal sensors 52, controlling cooling fans 50, and bidirectionally communicating various status and control signals to other circuits and controls, such as the weld controller 34. For example, the weld controller 34 is configured to output a command signal 58 to the digital controller 32. The command signal 58 may be an output current level for the welding power supply, a complex waveform, or a signal dependant on various inputs, such as the welding process being performed, user inputs received, voltage and current feedback signals, and so forth. As such, the weld controller 34 illustrated in the embodiment of FIG. 1 may allow the user to select and control a welding process via the user interface 48. Through the user interface 48, the weld controller 34 may provide various signals, indicators, controls, meters, computer interfaces, and so forth, which allow the user to set up and configure the welding power supply as required for a given welding process.

The digital controller 32 may be configured to receive one or more inputs from the weld controller 34 and to utilize such inputs to guide the functioning of the chopper circuit 10. For example, in one embodiment, the digital controller 32 may implement a PWM control scheme. Through a PWM control scheme, the digital controller 32 may regulate and control the output current and/or voltage of the welding power supply by varying the duty cycle of the power semiconductor switch 20. In such systems, the welding power supply may include a closed current control loop, such that the power supply may be operated as a controlled current source for the desired arc welding load conditions. As such, the digital controller 32 may control the minimum and maximum current levels output from the power source, control the rates of change of current between various levels, and generate the desired waveforms.

Embodiments of the present invention are illustrated herein in the context of chopper circuits. However, it should be noted that any of a variety of types of switched-mode power supplies that utilize semiconductor switches to chop a DC source of power and to convert the chopped power to a voltage and/or current suitable for welding may be utilized with the digital control methods and systems described herein. For example, embodiments of the present invention may utilize any of a variety of suitable inverter type power supplies, such as forward circuit, full-bridge, half-bridge, flyback, and so forth. Such power supplies may also include pre-regulator circuits configured to provide a regulated DC bus voltage to the inverter circuit. Indeed, any of a variety of suitable types or configurations of power supply circuits may be utilized in conjunction with the digital controller disclosed herein.

Figure 2:
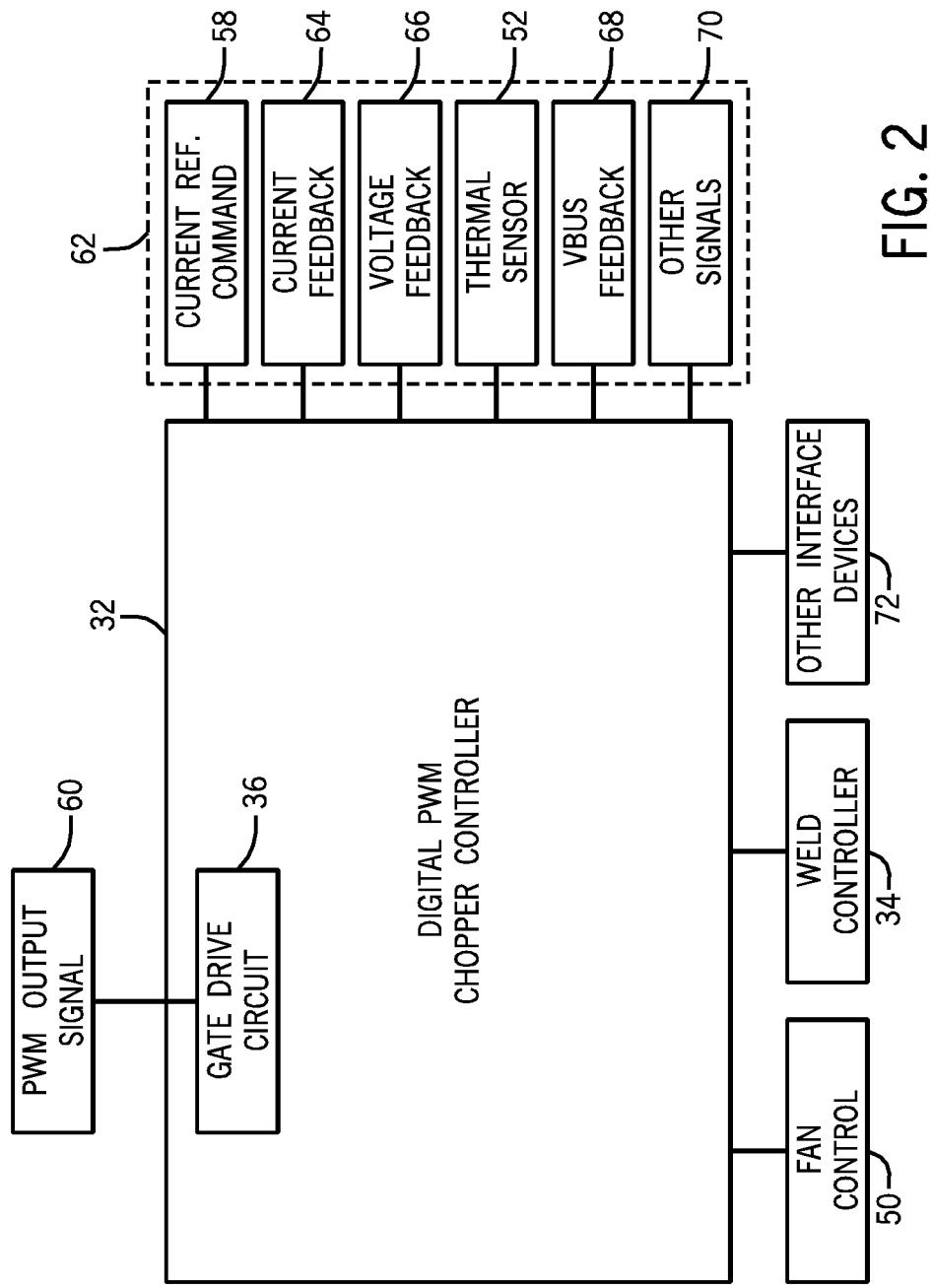
FIG. 2 is a diagram of an exemplary digital controller for a welding power supply that includes gate drive circuitry configured to drive switching one or more power semiconductor switches in accordance with aspects of the present invention.

FIG. 2 illustrates an exemplary digital PWM controller 32 for a welding power supply. The illustrated digital controller 32 includes gate drive circuitry 36 configured to drive the switching of the power semiconductor switch 20 of FIG. 1 via a PWM output signal 60. The digital controller 32 may also include a variety of circuitry not illustrated in FIG. 2. For example, the controller 32 may include circuit elements such as analog to digital converters, digital to analog converters, timers, microprocessors, signal conditioning and filtration circuitry, and so forth, which may be used to implement a control scheme for a switched mode welding power supply.

In the illustrated embodiment, the digital controller 32 is configured to receive a variety of analog inputs 62 including the reference current command 58, a current feedback signal 64, a voltage feedback signal 66, thermal sensor feedback 52, a bus voltage feedback signal 68, and any other suitable signals 70 that may be utilized by the controller 32 to implement the digital PWM control or to provide additional functions within the welding power supply. That is, the digital controller 32 may be utilized to perform many of the functions associated with a welding power supply that are not directly related to PWM control. Such functions may include thermal monitoring, controlling a cooling fan, controlling status indicators and relays, and so forth. In other embodiments, however, such peripheral functions may not be performed by the digital PWM controller 32 and may instead be performed by another microprocessor or control circuit. Nevertheless, in certain embodiments, it may be advantageous to utilize the digital PWM controller 32 to perform such functions in addition to performing the PWM control function. Additionally, the digital PWM controller 32 may interface with various other circuits or system components including the fan control 50, the weld controller 34, and any other suitable interface devices 72.

In some embodiments, it may be desirable to operate the switched mode welding power supply as a controlled current source, such that the current waveform may be controlled by the welding controller. That is, the welding controller may control parameters such as current level, rate of change of current, lower limit and upper limit current levels, current waveform shape, and other characteristics of the current to control arc characteristics. It should be noted that traditional control circuits may implement a high gain or integrating error amplifier with inputs such as a current command or reference waveform and current feedback. In such traditional circuits, the error amplifier may generate an error signal, which is traditionally compared to a ramp type signal by a comparator circuit. The output of the comparator circuit is a PWM signal, which is used to control the power semiconductor switches, thereby controlling the output of the welding power supply.

In some embodiments of switched mode type welding power supplies, the PWM duty cycle (D) may not directly control the output current, but is instead guided by the following relationship:

$$V\_OUT = D * V\_BUS, (0 < D < 1), \quad (1)$$

in which V_OUT is the output voltage, D is the duty cycle, and V_BUS is the DC bus voltage. As such, equation (1) is a typical first order relationship for duty cycle, output voltage and bus voltage for a chopper circuit. It should be noted that a similar relationship may be employed for an inverter type welding power supply, but may include a term accounting for the transformer turns ratio, among other factors.

It should be noted that an output current term is not in equation (1), but may be indirectly controlled by the relationship between arc voltage and current or the impedance at the arc in some embodiments. In some embodiments, the arc impedance may vary from a short circuit with low impedance to an open circuit with high impedance. Additionally, during a welding operation, the arc impedance may rapidly change (e.g., on the order of less than 1 mSec). As such, embodiments of the digital controller may vary the duty cycle term in equation (1) depending on the arc impedance. Traditional welding systems including a current error amplifier may require the control system to detect an error or difference between the commanded current and actual current before a change in PWM occurs. Embodiments of the presently disclosed digital PWM controller, however, may provide an improved PWM control by calculating and utilizing a variety of suitable terms to generate the necessary PWM duty cycle.

Figure 3:
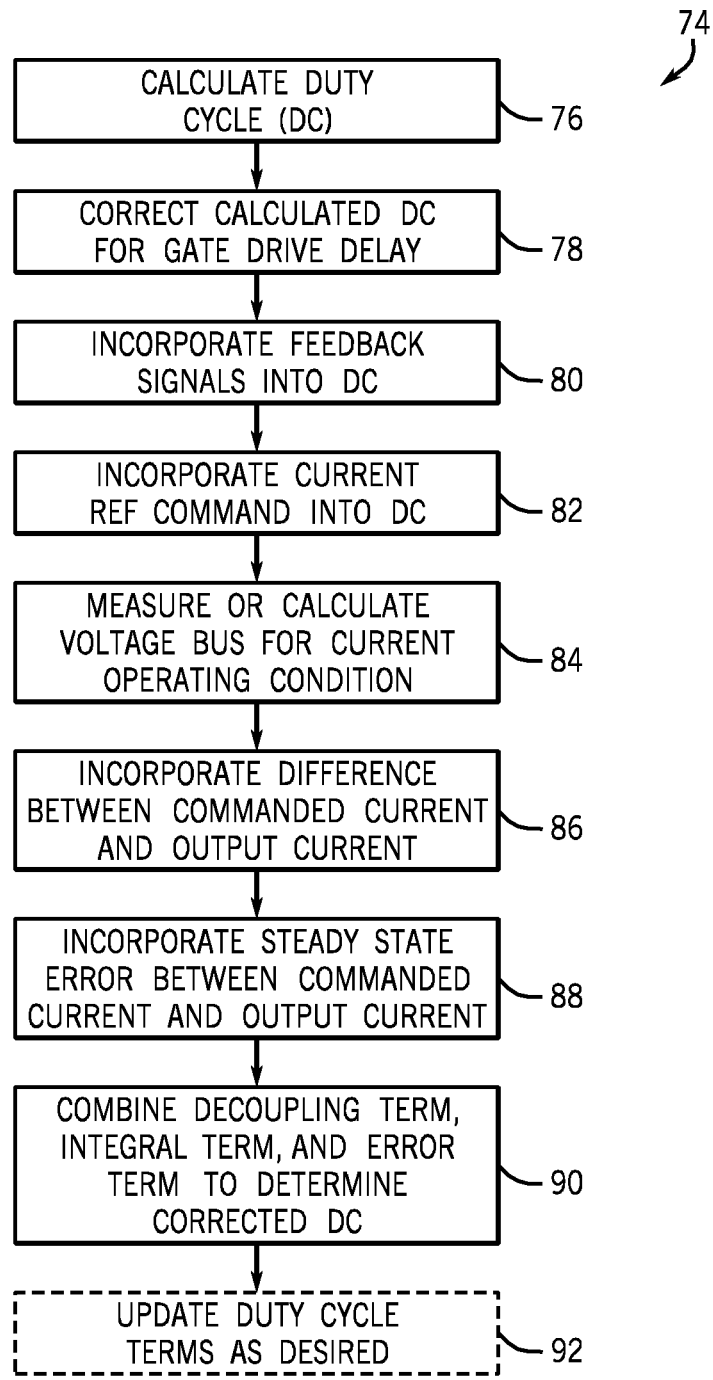
FIG. 3 is a flow chart illustrating an exemplary method that may be employed by a digital controller to calculate and set an appropriate duty cycle for a welding operation in accordance with aspects of the present invention.

FIG. 3 is a flow chart 74 illustrating an exemplary method that may be employed by the digital controller 32 of FIGS. 1 and 2 to calculate and set an appropriate duty cycle for a given welding operation. First, the controller may calculate the duty cycle (block 76) by employing a first order approximation of the relationship between output voltage and duty cycle as defined above in equation (1). However, in further steps of the method 74, the digital controller 32 may account for a variety of factors present in the welding environment that the first order approximation presented in (1) does not incorporate. For example, since V_BUS may vary with variations in the AC line voltage supplying the welding power supply as well as the output power of the welding power supply, the digital controller may utilize bus voltage feedback to measure and account for changes in the bus voltage. In some embodiments, the digital controller may employ a mathematical model for the bus voltage to account for changes in the bus voltage due to line voltage variations, output voltage, current or power, temperature, or other factors.

Furthermore, the digital controller 32 may employ the method 74 to account for losses or natural droop in an output volt-amp load line characteristic of the welding power supply. Additionally, by employing the digital controller 32, delays that occur in the power semiconductor switching circuit, such as gate drive turn ON or turn OFF delays, may be taken into account and utilized to improve system performance as compared to systems controlled by an analog controller. Specifically, the method 74 includes a step in which the calculated duty cycle may be corrected for the gate drive delay by adding or subtracting a fixed or variable delay term (block 78). As such, a more accurate model can be derived for the relationship between V_OUT and the duty cycle:

$$V\_OUT(t)=(D-D\_delay)*V\_BUS(t)-(I\_out(t)*R\_droop), \quad (2)$$

in which D_delay is the gate drive delay, I_out is the output current, and R_droop represents the losses or natural droop in the output volt-amp load line characteristic of the welding power supply. Equation (2) may be rearranged to give an expression for duty cycle:

$$D=\{V\_OUT(t)+(I\_out(t)*Rdroop)\}/V\_BUS(t)+D\_delay,(0<D<1), \quad (3)$$

The controller may then incorporate feedback signals into the duty cycle equation (3) and rescale accordingly (block 80). Similarly, the controller may substitute a commanded output current level for I_OUT(t) in equation (3) because the commanded current level is the target current level (block 82). As such, a decoupling term (D_dc) may be derived:

$$D\_dc=\{V\_fb*K1+I\_ref*K2\}/\{Vbus\_fb*K3\}+D\_delay, \quad (4)$$

in which V_fb is the feedback voltage, K1 is an appropriate constant, I_ref is the commanded output current level, K2 is an appropriate constant, Vbus_fb is the voltage bus feedback level, and K3 is an appropriate constant. It should be noted that Vbus_fb may be measured directly with a feedback circuit or may be estimated or calculated from another signal, such as from an auxiliary power supply winding and circuit connected to the transformer 14 in FIG. 1 (block 84). As such, equation (4) may by utilized by the controller to set the duty cycle according to a current operating condition for output voltage and bus voltage.

Still further, additional corrections may be further made to the duty cycle term to allow for dynamic changes in the duty cycle during operation to achieve a desired operating current level or load condition. Specifically, an additional term may be incorporated into the duty cycle calculation, which is proportional to the difference between the commanded current level and the actual output current level (block 86):

$$D\_error=(I\_ref-I\_fb)*K4, \quad (5)$$

in which D_error represents the duty cycle correction based on the current error, I_fb represents the feedback current level, and K4 is an appropriate constant. D_error may be positive or negative, and when added to the de-coupling term (D_dc) may provide a dynamic way for the digital controller to adjust the power supply duty cycle to provide a controlled and regulated current output.

Still further, an integral term (D_integral) may be included to further reduce or eliminate steady state error between the actual output current level and the commanded current level (block 88):

$$D\_integral=D\_integral\_previous+K5*D\_error, \quad (6)$$

in which D_integral_previous represents a previous integral term and K5 is an appropriate constant. It should be noted that the digital PWM controller 32 may be configured to selectively implement the integral term. That is, the controller 32 may only implement D_integral under certain conditions, such as when certain welding processes (e.g., GTAW) in which it is desirable to have zero steady state current error are selected by a user. For further example, the controller 32 may implement D_integral term when D_error (the proportional error term) is within a bounded range or when the current or voltage output is within a bounded range. Still further, in some embodiments, the controller may be configured to reset D_integral during certain conditions, such as when a welding operation has terminated, when the proportional error term is outside of a bounded range, or any other preset condition desired by an operator. Finally, in some embodiments, the integral term may not be implemented by the controller 32 at all.

The method 74 also includes addition of the calculated duty cycle correction terms together to calculate a required duty cycle (D_total) for any given output operating current and load condition (block 90):

$$D\_total=D\_dc+D\_error+D\_integral. \quad (7)$$

In some embodiments, the digital controller 32 may impose further updates on the calculated D_total or its associated terms as desired (block 92). For example, the controller 32 may limit the minimum or maximum value of D_total. For further example, the controller may further modify the duty cycle terms. In one embodiment utilizing an inverter type power supply, the effect of leakage inductance in the high frequency transformer may cause an effective delay dependant on the reflected output current. Such a delay may be incorporated into D_total by providing a variable D_delay term that is dependent on output current, commanded current, primary transformer current or any other suitable input capable of accounting for the variable effect of leakage inductance.

Figure 4:
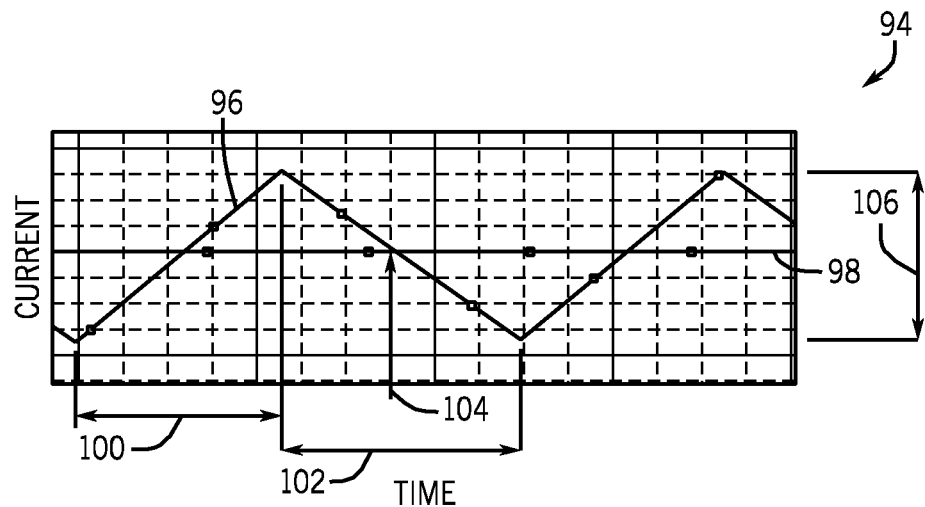
FIG. 4 is a graph illustrating an exemplary actual current output waveform and an exemplary average current waveform that may be generated at a first output voltage and a first load condition in accordance with aspects of the present invention.

FIG. 4 is a graph 94 illustrating an exemplary actual current output waveform 96 and an exemplary average current waveform 98 that may be generated at a first output voltage and a first load condition. The actual current waveform 96 includes an active "ON" portion 100 and an inactive "OFF" portion 102. The active "ON" portion 100 represents the time during which power semiconductor 20 is ON, and the inactive "OFF" portion 102 represents the time when power semiconductor 20 is OFF and diode 22 is conducting. As illustrated, at a point 104 equal to one half the "OFF" portion 102, the value of the actual current output waveform 96 is approximately equal to the value of the average current waveform 98. Furthermore, although the average current waveform 98 represents the desired current output, the actual output current waveform 96 has a peak to peak ripple 106. An amplitude of the peak to peak ripple 106 may be a function of a variety of factors, such as features of the power supply smoothing inductor, the inductance of the welding leads, the output voltage, the switching frequency, and so forth.

Figure 5:
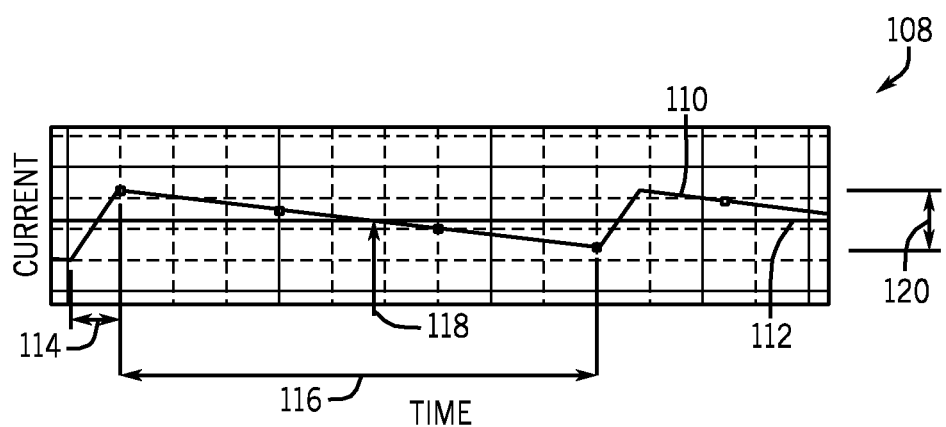
FIG. 5 is a graph illustrating an exemplary actual current output waveform and an exemplary average current waveform that may be generated at a second output voltage and a second load condition in accordance with aspects of the present invention.

FIG. 5 is a graph 108 illustrating an exemplary actual current output waveform 110 and an exemplary average current waveform 112 that may be generated at a second output voltage and a second load condition. As before, the actual current output waveform includes an "ON" portion 114, an "OFF" portion 116, a point equal to one half the "OFF" portion 118, and a peak to peak ripple 120. However, at the second output condition, the "ON" portion 114 is shorter than the "ON" portion 100 at the first output condition in FIG. 4. Nevertheless, at the midpoint 118 of the "OFF" portion, the actual current waveform 100 is approximately equal to the value of the average current waveform 112. FIGS. 4 and 5 further illustrate that at approximately the mid point of the "ON" portion of the actual current waveforms, 96 and 110, the actual current is approximately equal to the value of the average current waveform. It is now realized that such a feature may allow embodiments of the presently disclosed digital controller to obtain a single current feedback sample value that is synchronized to occur at the midpoint of the "OFF" portion of every switching cycle. It should be noted, however, that in additional embodiments, a single current feedback sample may be obtained that is synchronized to occur at the midpoint of the "ON" portion.

The foregoing feature of the presently disclosed digital controller may offer distinct advantages over traditional power supply controllers. For example, analog control systems traditionally operate by filtering the current feedback signal to reduce the amplitude of the peak to peak value at the expense of phase shifting or adding time lag to the signal. Similarly, digital control theory, which typically guides operation of digital controllers, leads to oversampling of the current waveform. For example, such a theory may dictate the acquisition of ten or more samples per period of the waveform and the subsequent calculation of an average value based on the ten or more samples. However, with a 20 KHz switching frequency for the welding power supply, for example, such a theory dictates acquisition of 200,000 or more samples per second, which would have to be digitized and averaged to arrive at an accurate average value. Embodiments of the presently disclosed digital controller, however, may acquire a single sample for current feedback that is synchronized to occur every switching cycle at the midpoint of the "OFF" portion of the actual current waveform. As shown in FIGS. 4 and 5, this is possible because the output current value at the midpoint of the "OFF" portion is approximately equal to the average value of the current waveform.

Still further, in additional embodiments, a single sample for current feedback may be synchronized to occur every switching cycle at the midpoint of the "ON" portion of the actual current waveform. In other embodiments, two samples may be obtained, with the first sample synchronized to the approximate midpoint of the "ON" portion and the second synchronized to the approximate midpoint of the "OFF" portion. Further embodiments may average the two samples or selectively obtain and/or use either of the two samples dependant on various operating conditions such as duty cycle, output current or voltage, or other conditions.

Figure 6:
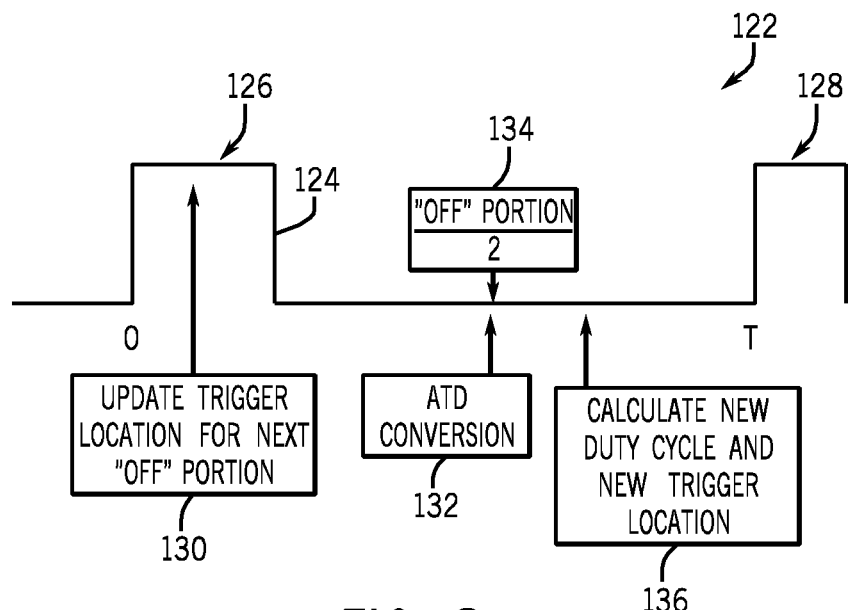
FIG. 6 is an exemplary timing diagram including an exemplary pulse width modulated waveform that may be generated by a digital controller in accordance with aspects of the present invention.

FIG. 6 is an exemplary timing diagram 122 including an exemplary pulse width modulated waveform 124. Such a diagram illustrates how embodiments of the digital PWM controller disclosed herein may synchronize digital sampling and conversion to occur at the midpoint of the "OFF" portion by recalculating a trigger location for an analog to digital conversion based on the calculated duty cycle value. The value for the trigger location for the analog to digital conversion may be further corrected if desired to account for any small phase shift or delay in the current feedback signal representing output current or for any time lag that the conversion itself necessitates. That is, the location of the conversion may be adjusted such that the digitized value will be approximately equal to the average value of the waveform. As such, the trigger location for the analog to digital conversion (ATD_TRIGGER) may be given by:

$$ATD\_TRIGGER=(1-D)/2+Correction\_factor, \qquad (8)$$

in which D is the calculated duty cycle and Correction_factor is the adjustment factor.

For example, in the embodiment illustrated in FIG. 6, the waveform 124 includes a first duty cycle 126 and a second duty cycle 128. The ATD trigger location is updated during the active duty cycle 126 (e.g., the "ON" portion) by the digital controller (block 130). The digital controller is configured to perform the ATD conversion (block 132) at approximately one half the "OFF" portion (block 134). After performing the ATD conversion (block 132) the digital controller is further configured to calculate a new duty cycle and a new trigger location for the next period (e.g., duty cycle 128). As such, by sampling and converting the feedback signals at approximately the midpoint of the "OFF" portion, the duty cycle may be calculated using digitized values that represent the average value of the waveform. Such a method employed by the digital controller also facilitates calculation of the next duty cycle 128 with feedback values that represent a state of the welding power supply as well as the desired reference current command, which may be determined by the weld controller, prior to the onset of the next duty cycle "ON" portion 128. Such a feature may allow the welding power supply to be responsive to changes or desired changes during the welding operation while reducing or eliminating the time delay as compared to traditional systems.

It should be noted that in some embodiments, it may be desirable to update the ATD trigger (sampling) location only once per cycle so that consistent inputs are generated and used to calculate the operating duty cycle. Further, it may be advantageous to update the ATD trigger location during the "ON" portion as described in detail above such that the new trigger location may be implemented by the digital controller prior to the start of the subsequent "OFF" portion. It should also be noted that in some embodiments, the digital controller may be further configured to read and convert additional analog signals in a synchronized manner to the PWM waveform. Such additional signals may include voltage feedback, bus voltage feedback, reference current commanded by the weld controller, and so forth. The additional signals may be used by the digital controller along with current feedback to calculate the operating duty cycle.

Figure 7:
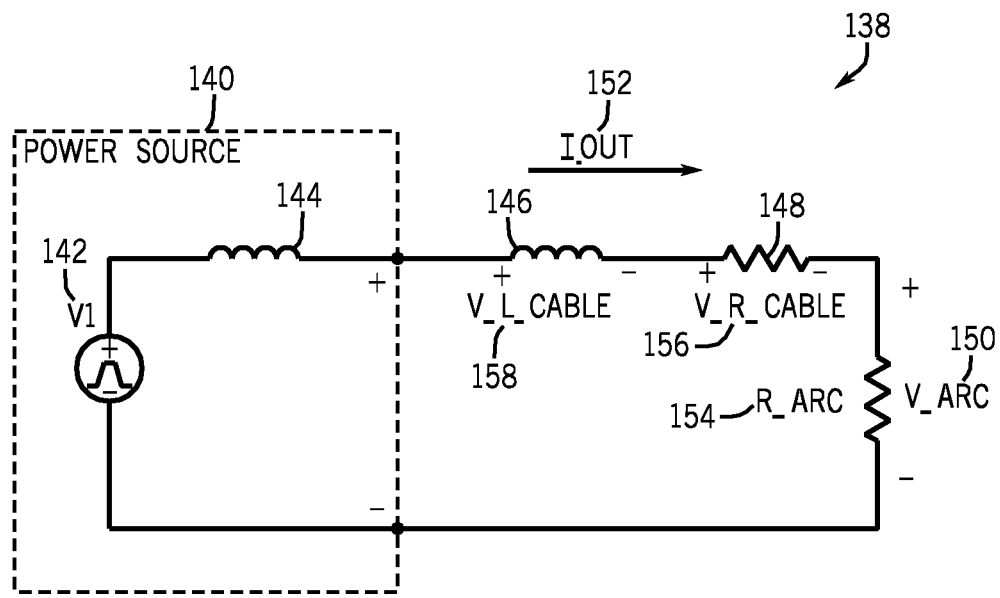
FIG. 7 is a schematic diagram of an exemplary chopper or inverter type welding power supply system including electrical components of a power supply and one or more external components in accordance with aspects of the present invention.

FIG. 7 is a schematic diagram 138 of an exemplary chopper or inverter type welding power supply system. The diagram 138 includes a power source 140 including an output voltage source 142 controlled by a duty cycle, which is determined by the digital controller, and an inductor 144. The inductor 144 is the internal power supply smoothing inductor, which is configured to smooth the output current. An inductor 146 and a resistor 148 represent the equivalent electrical characteristics of the external welding leads, which may include the work lead (e.g., the ground lead) as well as leads to a wire feeder or other components. The diagram 138 also includes an arc voltage 150 present between a work piece and a welding torch or electrode. The diagram 138 also includes an output current 152 from the welding power source, which is the current flowing in the welding arc.

The diagram 138 further includes an arc impedance 154 that represents the arc impedance at a particular arc condition according to the arc voltage and output current. It should be noted that the range of the arc impedance 154 may vary during operation and is dependent on the particular arc conditions present in the welding operation. For example, prior to arc initiation when current is not yet flowing, the arc impedance 154 may be large because the output of the power supply is at an open circuit condition. However, during arc initiation, when the electrode is contacting the work piece, the arc impedance 154 may be low or even approximately zero. Further, during a welding condition, the arc impedance 154 may vary due to factors such as the type of weld process, the welding current, operator technique, shielding gas, and so forth. As such, the welding arc is dynamic and may vary between a short circuit condition and an open circuit condition.

It should be noted that the voltage drop across the equivalent inductance and resistance of the weld cable will add to or subtract from the arc voltage 150 as observed at the output terminals of the power source. Such a feature may typically interfere with the ability of the weld controller to control the output voltage 150 and/or the output current 152. Such interference may also inhibit the ability of the weld controller to properly detect the arc voltage, as necessary for certain welding processes, such as detecting the onset or clearing of a short circuit. Such interference may also impact the ability of the digital PWM controller to accurately calculate a duty cycle term dependant on output voltage because the voltage represented in the voltage feedback signal, which is derived from the output terminals, may not represent the true arc voltage. However, it is now recognized that a voltage drop across the equivalent cable resistance 156 is an offset proportional to output current 152 and does not change as the configuration of the weld cables changes. The voltage drop across the equivalent cable resistance 156 is a function of the cable length, the cross sectional area of the cable, and so forth.

It should be noted that an illustrated voltage drop across the equivalent cable inductance 158 is a function of the time rate of change of the output current (e.g., first derivative of current):

$$V\_L\_cable \approx L\_cable * \Delta I\_out/\Delta t, \quad (9)$$

in which V_L_cable is the voltage drop across the equivalent cable inductance, L_cable is the inductance of the cable, and ΔI_out/Δt is the rate of change of the output current. The effects of the voltage drop across the inductance of the weld cable may vary with the cable arrangement and value of inductance. High levels of induced voltage on the weld cables may cause ringing (i.e., instability) in the output current of the welding power supply. As such, embodiments of the presently disclosed digital controller may be configured to dampen such ringing by clamping the maximum value of the voltage feedback received and used for calculating the duty cycle, thereby limiting the effect of the induced voltage. That is, embodiments of the present invention may clamp the value of the feedback voltage used for calculating duty cycle to a suitable value. For example, certain embodiments, the feedback voltage value may be clamped to a value that is a preset percentage above the target voltage or to a preset level that is greater than a typical arc voltage level that may be reached during the given welding process.

Figure 8:
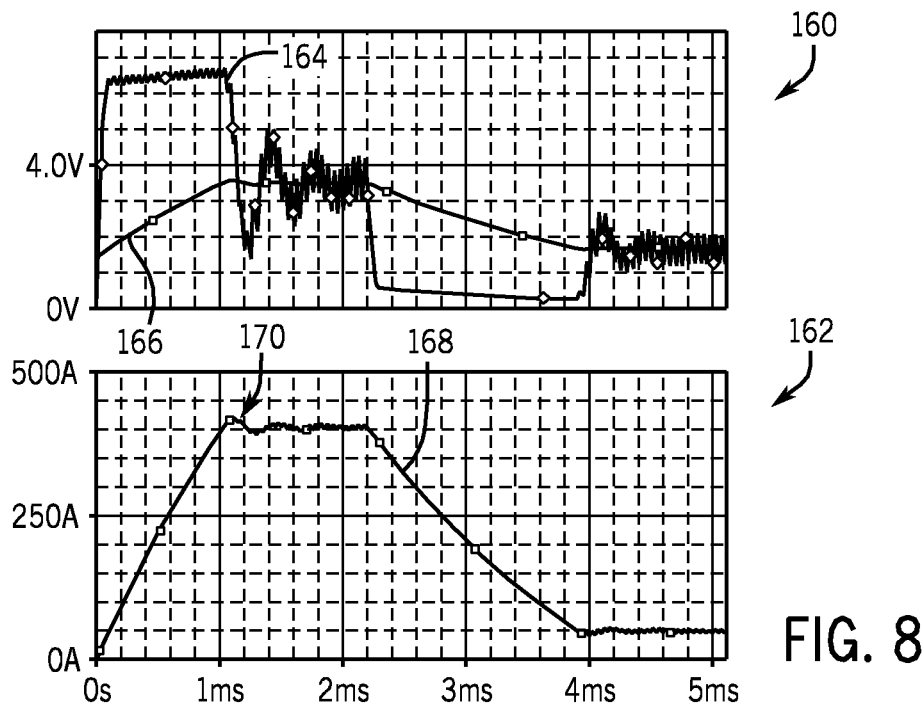
FIG. 8 illustrates an exemplary unclamped voltage plot and an exemplary unclamped current plot over time in accordance with aspects of the present invention.

FIG. 8 includes an exemplary unclamped voltage plot 160 and an exemplary unclamped current plot 162. As shown, the unclamped voltage plot 160 includes a voltage feedback signal waveform 164 representative of the output terminal voltage and an actual arc voltage waveform 166 representative of an exemplary scaled true arc voltage. As illustrated, the current plot 162 includes a current waveform 168 that includes ringing or oscillation 170 on the peak value. It should be noted that the induced voltage across the cable inductance due to the rising edge of output current may cause the voltage feedback waveform 164 to be substantially greater than the actual voltage waveform 166 at the arc. In some embodiments, such an effect may cause the ringing 170 evidenced in the output current waveform 168.

Figure 9:
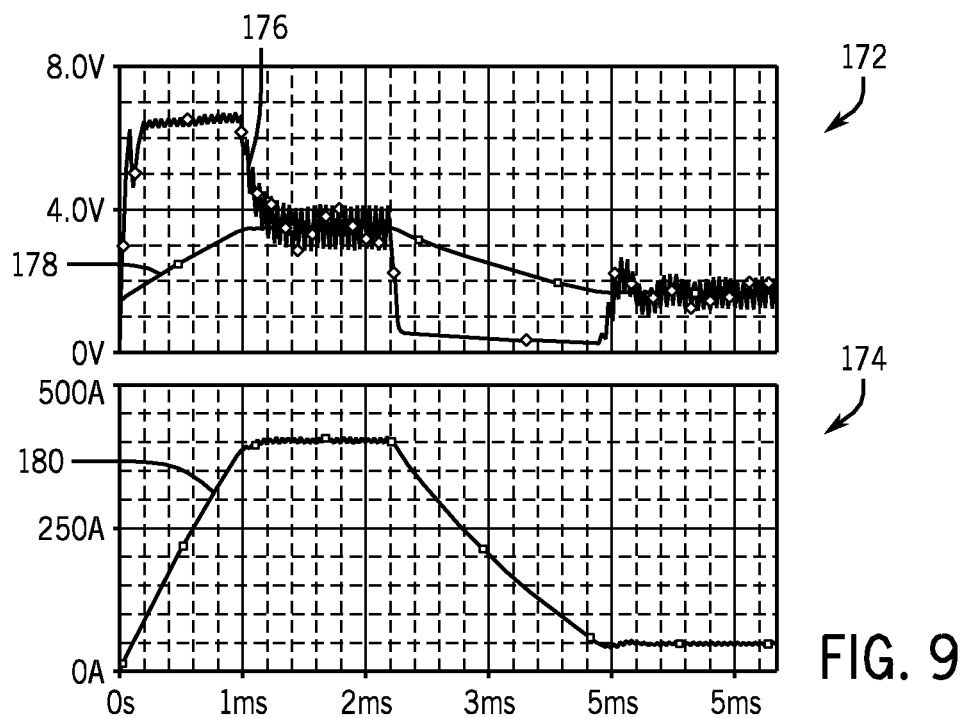
FIG. 9 illustrates an exemplary clamped voltage plot and an exemplary clamped current plot over time in accordance with aspects of the present invention.

FIG. 9 includes an exemplary clamped voltage plot 172 and an exemplary clamped current plot 174. As shown, the clamped voltage plot 172 includes a voltage feedback signal waveform 176 representative of the output terminal voltage and an actual arc voltage waveform 178 representative of an exemplary scaled true arc voltage. As illustrated, the current plot 174 includes a current waveform 180, which illustrates the effect of the digital controller directing the clamping of an upper limit value of the feedback voltage that is used by the digital controller to calculate the operating duty cycle as in equation (4). It should be noted that while the actual value of the feedback voltage is approximately equal in FIGS. 8 and 9, the digital controller is configured to clamp the value used in equation (4). As such, the current waveform 180 in FIG. 9 does not exhibit the ringing or oscillation 170 that is exhibited on the peak of the current waveform 168 in FIG. 8. Accordingly, embodiments of the presently disclosed digital controller provide for clamping of the feedback voltage.

Embodiments of the presently disclosed digital controller may be further configured to reduce or eliminate the effects of the induced voltage in the voltage feedback signal due to weld cable inductance. As such, further improvements to the digital PWM control and/or the voltage feedback signal may be obtained with embodiments of the digital controller. Specifically, embodiments of the present invention include a method that may be employed by the digital controller for measuring or estimating the weld cable inductance during a welding operation and using this value of inductance to compensate or correct the voltage feedback signal.

Referring again to the equivalent circuit 138 of FIG. 7, it can be seen that there are two inductors 144 and 146 connected in series. The input waveform to inductor 144 from voltage source 142 is the chopped bus voltage 54 with a duty cycle that is set by the digital PWM controller 32. As such, the inductors 144 and 146 form an AC voltage divider circuit, which splits the high frequency AC component of the chopped DC bus voltage 54 according to their relative inductance values, yielding the following equation:

$$\text{Inductance\_144}/\text{Inductance\_146} = V\_144/V\_146, \quad (10)$$

in which Inductance_144 is the inductance of inductor 144, Inductance_146 is the inductance of inductor 146, V_144 is the voltage of inductor 144, and V_146 is the voltage of inductor 146.

A measurement of the peak-to-peak high frequency (e.g., the switching frequency) AC voltage present on the output terminals may be used by embodiments of the digital controller to calculate or estimate the equivalent cable inductance, Inductance_146, if the value of the inductor 144 is known and if the value of the bus voltage 54 is also known or estimated. It is now recognized that the equivalent impedance of the inductors 144 and 146 at the switching frequency may be greater than the impedance of the cable resistance 148 and the arc impedance 154 during some or all of a welding operation. As such, embodiments of the present invention may provide for the cable impedance or inductance to be measured or calculated by comparing the relative peak to peak AC voltage present across each inductor according to equation (9). That is, the input to the inductor 144 is approximately equal to the chopped DC bus voltage. The peak to peak voltage may be measured directly or estimated based on the measured, calculated or estimated DC bus voltage. A measurement of the peak to peak AC voltage signal at the output terminals of the welding power source may be acquired. Such a measurement may be utilized by the digital controller to calculate which portion of the chopped DC bus voltage is dropped across the internal inductor 144 and how much peak to peak AC voltage is dropped across the equivalent weld lead inductance 146.

Such a peak to peak AC voltage relationship may be utilized by the controller along with a known value of the inductance of inductor 144 to calculate the inductance of inductor 146. As such, embodiments of the presently disclosed digital PWM controller may enable the high frequency AC component (i.e., the peak to peak value) of the output voltage to be measured during the welding operation and may further enable the measured value to be utilized to determine the equivalent cable inductance.

Figure 10:
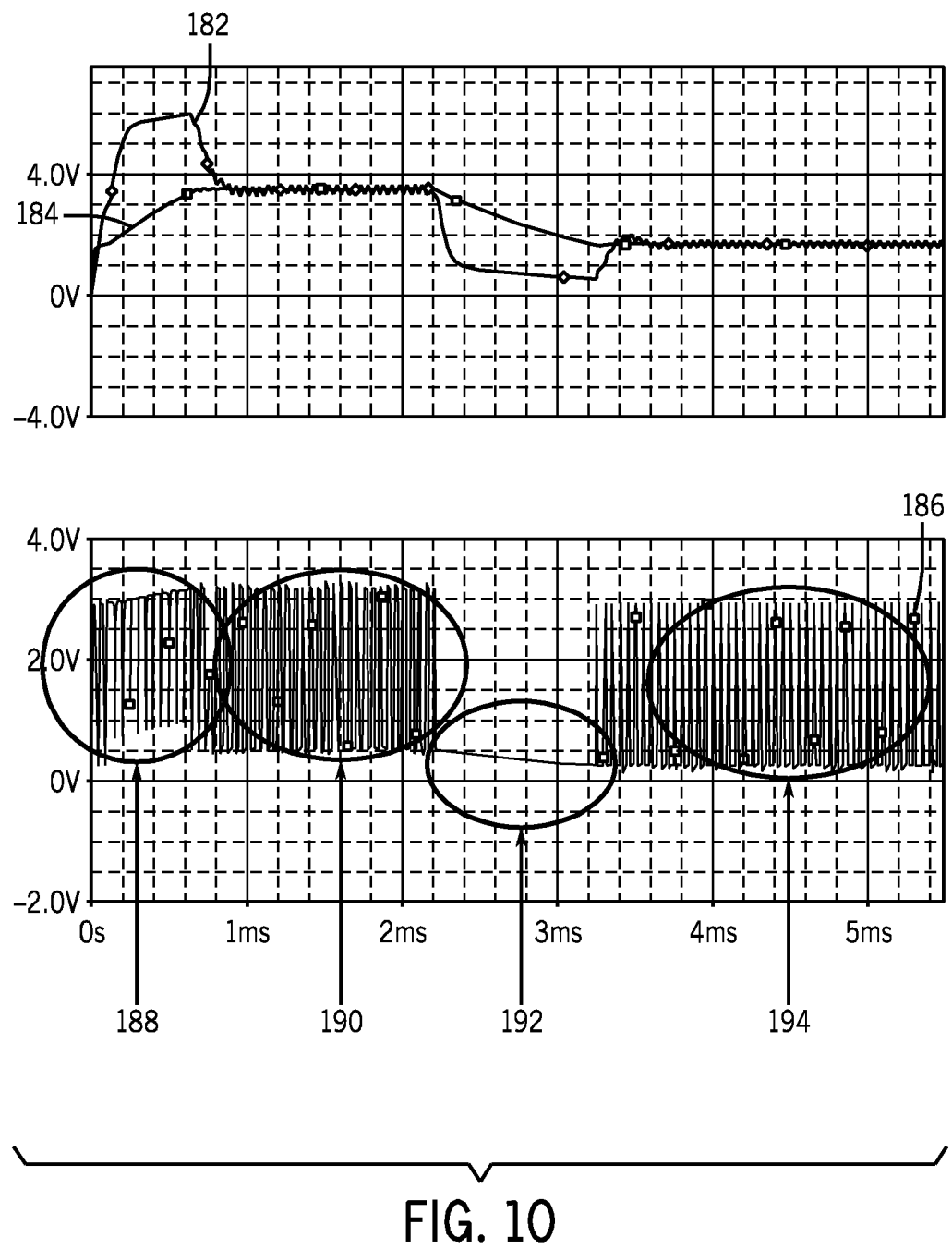
FIG. 10 illustrates voltage plots including an exemplary filtered voltage feedback waveform, an exemplary scaled voltage waveform, and an unfiltered fast voltage waveform in accordance with aspects of the present invention.

FIG. 10 illustrates voltage plots that may be generated during a pulse of current, such as the pulse of current shown in FIG. 9. The voltage plots include an exemplary filtered voltage feedback waveform 182, an exemplary scaled voltage waveform 184 representative of the actual arc voltage, and a relatively unfiltered fast voltage feedback waveform 186. That is, the filtered voltage feedback waveform 182 is representative of an exemplary signal with an overshoot and an undershoot caused by the induced voltage of the weld cable inductance. The relatively unfiltered fast voltage waveform 186 represents an unfiltered signal that may be generated during a first amplifier stage of a circuit that may be utilized to measure the output terminal voltage and provide a scaled feedback signal for use by the PWM digital controller.

Figure 11:
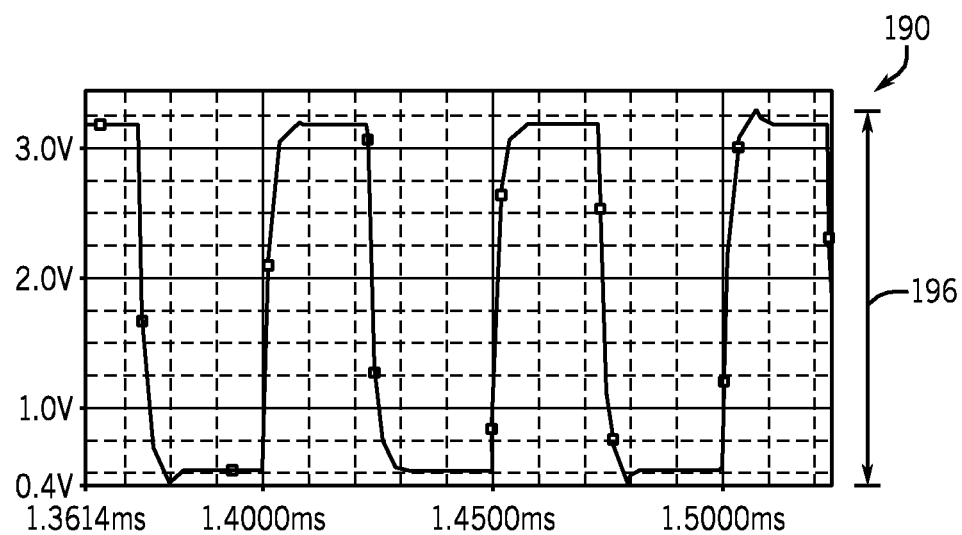
FIG. 11 illustrates a selected region of the unfiltered fast voltage waveform of FIG. 10 in more detail in accordance with aspects of the present invention.
Figure 12:
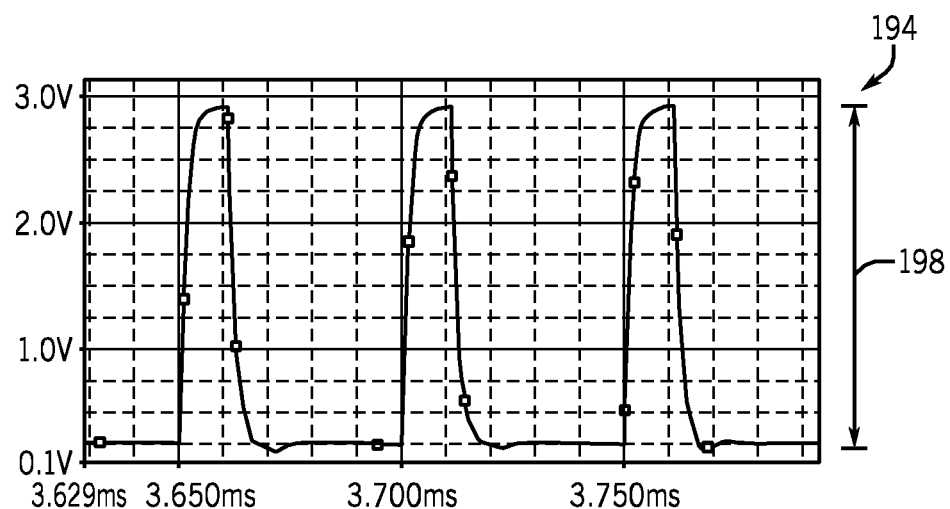
FIG. 12 illustrates a selected region of the unfiltered fast voltage waveform of FIG. 10 in more detail in accordance with aspects of the present invention.

As illustrated in FIG. 10, the unfiltered voltage waveform 186 includes a first region 188, a second region 190, a third region 192, and a fourth region 194. The second region 190 and the fourth region 194 represent time intervals where there is an approximately stable peak to peak high frequency AC component that may be read by the configured digital PWM controller and used to calculate or estimate cable inductance. It should be noted that such regions 190 and 194 may also be representative of regions where the average voltage and current are approximately constant, such that the effect of induced voltage due to changing current may be at a lower limit. It should also be noted that such regions 190 and 194 may also be where the PWM duty cycle is at an approximate midrange value, which is not near an upper limit value or a lower limit value. As such, the second region 190 is shown in more detail in FIG. 11, and the fourth region is shown in more detail in FIG. 12. As illustrated, a peak to peak voltage value 196 of the second region 190 and a peak to peak voltage value 198 of the fourth region 194 are approximately equal even though the high and low voltage values are different. That is, the second region 190 is offset to a higher overall level because it is a region of higher output current and therefore higher average arc voltage. However, the peak to peak voltages values 196 and 198 are still approximately equal.

The first region 188 and the third region 192, on the other hand, represent regions where there is not a valid peak to peak high frequency AC component that may be utilized by the digital PWM controller. That is, the first region 188 and the third region 192 may occur during dynamic changes in the output operating point of the system, such as when the PWM duty cycle is operating near upper limit or lower limit values or when the duty cycle has gone to zero and switching of the power semiconductor in the chopper circuit is not occurring.

Embodiments of the presently disclosed digital controller may be configured to measure the peak to peak high frequency AC component shown in the second region 190 and the fourth region 194 to calculate an inductance value for the output weld cable circuit based on the measured peak to peak component. As described in detail above with respect to FIG. 6, the digital controller is configured to sample and perform a digital conversion at the midpoint of the "OFF" portion for the current feedback signal and the voltage feedback signal, among other signals. Embodiments of the digital PWM controller may be further configured to perform an additional sample and conversion of the unfiltered voltage waveform 186 at approximately the midpoint of the "OFF" portion and an additional sample of the waveform 186 at approximately the midpoint of the "ON" portion of the waveform.

Such samples of the unfiltered voltage waveform 186 may be acquired and utilized by the digital controller for calculating cable inductance when the duty cycle falls within a preset range and/or when the output current or voltage falls within a preset range. In some embodiments, the digital controller may restrict sampling of the unfiltered voltage waveform to regions of approximately constant average current or voltage. As such, the digital controller may be configured to sample and calculate cable inductance only during the second region 190 and the fourth region 194 and not during the first region 188 and the third region 192 as shown in FIG. 10. Furthermore, the digital controller may be configured to acquire such measurements in appropriate pairs. That is, if the digital PWM controller detects that the duty cycle falls within the preset range to measure the peak value of the AC component during the "ON" portion, then a corresponding value will be acquired during the subsequent "OFF" portion (e.g., at approximately the midpoint of the "OFF" portion). Such acquired values may then be used by the digital controller to calculate a difference or peak to peak value according to the equation:

$$V\_pk\text{-}pk = \{\text{Unfiltered}\_V(\text{sample1:Peak value}) - \text{Unfiltered}\_V(\text{sample2:valley or minimum value})\}, \quad (11)$$

in which V_pk-pk is the calculated peak to peak value, which is equal to the first sampled value minus the second sampled value.

The digital controller may be further configured to obtain additional samples and calculations for the peak to peak value to obtain a running average or smoothed value over a suitable period of time to reduce or eliminate the potential effects of noise, erroneous samples, and so forth. Subsequently, the digital controller may calculate or approximate the equivalent cable inductance (i.e., inductance of inductor 146, L_cable) by utilizing the measured value for the voltage bus feedback or any other suitable equivalent signal capable of providing information as to the magnitude of the chopped DC voltage at the input to the inductor and the known value of inductance for the internal power supply smoothing inductor 144:

$$L\_cable = L\_144 * \{(V\_pk\text{-}pk)/(V\text{bus\_feedback} - V\_pk\text{-}pk)\}. \quad (12)$$

It should be noted that alternative methods of measuring the peak to peak AC voltage at the output terminals of the power supply and utilizing such a measurement to calculate or estimate weld cable inductance may be employed. For example, the peak to peak AC voltage may be combined with a measured or estimated bus voltage or peak to peak AC voltage to the input of inductor 144 to calculate or estimate weld cable inductance. In one embodiment, an analog envelope or peak to peak detection circuit may be utilized to provide a direct analog value representative of the peak to peak voltage. Such a value may be utilized by the digital PWM controller or by the weld controller or other suitable circuitry to calculate or estimate weld cable inductance 146. Such methods may include steps to selectively utilize the analog peak to peak value during certain periods, such as when the average output current or voltage falls within a range and/or is at an approximately fixed value.

It should be noted that in some embodiments, the peak to peak voltage as well as the estimated or calculated weld cable inductance value may be utilized by the weld controller exclusively, by the digital PWM controller exclusively, by both the weld controller and the digital PWM controller, or by other suitable circuitry. That is, in some embodiments, the PWM controller may provide sufficient duty cycle control by clamping the voltage feedback signal. In other embodiments, however, it may be desirable to correct the feedback voltage signal that may be utilized by the digital PWM controller by utilizing the calculated inductance value. In further embodiments, the estimated or calculated weld cable inductance may be further refined or adjusted by taking into account the resistance of the weld cable circuit and/or the impedance of the welding arc.

The digital controller may be configured to utilize the calculated equivalent cable inductance (L_cable) to correct or compensate the feedback voltage during the welding operation. That is, referring to equation (9), V_L_cable may then be calculated by the digital controller by multiplying L_cable by the time rate of change of output current. For example, the digital controller may utilize discrete output current values, as measured once per switching cycle, combined with the period of the switching waveform to calculate V_L_cable.

In further embodiments, the digital controller may use any other suitable method for calculating V_L_cable. For example, in another embodiment, the controller may use a look-up table, which provides an estimation of cable inductance based on the measured peak to peak voltage feedback value. Additionally, in some embodiments, once a value for cable inductance has been calculated by the digital controller, such a value may be retained after a particular weld sequence has ended and the arc has been extinguished. The retained value may then be used as an initial value for the next weld sequence, thereby providing an initial start value for cable inductance. Subsequent values for cable inductance may then be recalculated by the digital controller as new data becomes available during the welding process.

In further embodiments, a look-up table may be used to provide a correction factor for the feedback voltage rather than providing an inductance value. Still further, the feedback voltage value (Vfb_corrected) may be calculated according to the following equation:

$$Vfb\_corrected = Vfb + K*L\_cable*(Ifb - Ifb\_previous)/\Delta t. \quad (13)$$

As such, the correction to the feedback voltage may be obtained via addition of the first derivative of the current feedback with an appropriate gain value based on measured cable inductance. The inductance value or voltage feedback correction value determined by any of the disclosed methods may be communicated to other circuits and controls via an analog or digital signal representative of the value or a range of values. In some embodiments, the weld controller may use the measured or calculated value of inductance in various ways to improve the welding process control, such as for improving the detection of a short circuit by using a corrected voltage feedback signal, modification of various weld process control parameters or waveforms to compensate or correct for the weld cable inductance, alerting an operator via a user interface of a condition when the inductance is outside of an acceptable range, or any other suitable way. Still further, in other embodiments, the digital controller may be further configured to correct or compensate for the weld cable resistance. As previously described with respect to FIG. 7, the weld cable resistance will be exhibited as a DC or offset voltage drop 156 proportional to output current 152. It should be noted that since the resistance value remains relatively constant with changes in orientation or coiling of the weld cable, a resistance value may be measured, calculated, estimated or input to the weld system. The resistance value may then be utilized by the digital controller with the value of the output current at any given time to correct for cable resistance. For example, relevant data, such as total weld cable loop length and cable size, may be entered by an operator via a user interface and used to estimate or calculate the cable resistance.

It should be noted that the digital PWM controller may be further configured to provide a variety of additional features and benefits over traditional analog controllers. For example, some welding processes, such as GTAW, utilize low output currents as compared to other welding processes. Traditionally, the output current of the welding power supply includes an average value corresponding to a target output current command level and a peak to peak ripple value depending on this average value, as discussed in detail above. For certain processes in which the average output current is low, there exists the possibility that a lower limit value of the current ripple becomes zero, and the output current is discontinuous. When such a possibility is realized in a welding operation, an arc outage may occur. The digital PWM controller may reduce or eliminate this possibility by allowing the switching frequency to be modified based on the selected welding process and/or output current level. For example, in a low current GTAW process, the switching frequency may be increased by a factor of two or three times that of a higher current process to reduce the peak to peak ripple component, thereby allowing for lower average output current without achieving a discontinuous output current condition. Furthermore, the digital PWM controller may be configured to allow the switching frequency of the power semiconductor switch to be selectively reduced for certain welding processes or when operating at certain output current levels. For example, at high output current levels or in welding processes such as FCAW or CAC, it may be desirable for the digital controller to reduce the switching frequency of the semiconductor switches in order to reduce switching losses.

Still further, the digital PWM controller may be configured to set lower limit and/or upper limit duty cycle ranges, which may be dependent on an operating condition, such as the weld process, the output current level, or the voltage level. For example, during a dynamic weld condition, it may be desirable to control the duty cycle to a preset upper limit value (e.g., D_max=0.9) to provide for fast dynamic response of an output current or voltage. However, it may be desirable to limit the duty cycle to a lower value (e.g., D_max=0.5) for steady state operation, such that the maximum continuous output of the welding power supply is limited to reduce thermal stress on the power components.

Additionally, the digital controller may be configured to selectively skip switching cycles based on a predetermined output current, a predetermined voltage condition, or a selected weld process. For example, the digital controller may skip one or more switching cycles during low current and voltages when the duty cycle may be low enough to approach the gate drive propagation delay times, thus rendering it difficult to accurately control the output. Alternately, the digital controller may implement a control method where the pulse width (e.g., the "ON" portion) varies according to the demands of the control system until the pulse width reaches a lower limit value. Beyond this lower limit value, the digital controller may implement frequency modulation.

Furthermore, embodiments of the digital controller may be configured to modify the duty cycle gain or coefficient terms (e.g., K1-K5) based on various factors, such as weld cable inductance and/or resistance, arc impedance, the bus voltage, and so forth, which may impact the overall control loop gain or response. For example, the digital controller may modify the value of K4 or K5 based on the calculated equivalent arc impedance, a selected welding process, a target or commanded output current level, and so forth. Indeed, the digital controller may modify various other factors or coefficients of a compensation function or control loop system to improve the control loop for various operating conditions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding power supply comprising:
   power conversion circuitry comprising one or more power semiconductor switches, wherein the power conversion circuitry is configured to receive power from a primary source and to switch the one or more power semiconductor switches between an ON configuration and an OFF configuration to convert the received power to a welding output; and
   a pulse width modulated (PWM) digital controller coupled to the power conversion circuitry and configured to modify a switching frequency of the one or more power semiconductor switches based at least in part on a selected welding process of the welding power supply and an operating condition of the welding power supply.

2. The welding power supply of claim 1, wherein the power conversion circuitry comprises an inverter-type power supply that comprises at least one of a forward circuit, a full bridge inverter, a half bridge inverter, and a flyback circuit.

3. The welding power supply of claim 2, wherein the power conversion circuitry further comprises a pre-regulator circuit.

4. The welding power supply of claim 1, wherein the power conversion circuitry comprises a chopper circuit configured to utilize a line frequency transformer to transform an AC line voltage to a welding voltage and a welding current.

5. The welding power supply of claim 1, wherein the operating condition of the welding power supply comprises a current level of the welding output.

6. The welding power supply of claim 1, wherein the operating condition of the welding power supply comprises a bus voltage of the welding power supply.

7. The welding power supply of claim 1, wherein the operating condition of the welding power supply comprises a predetermined output current.

8. The welding power supply of claim 1, wherein the operating condition of the welding power supply comprises a calculated duty cycle term.

* * * * *